Nov. 18, 1969     W. C. LOUDEN     3,479,170
METHOD OF SEALING ZIRCONIUM HYDRIDE COATED NIOBIUM
END CAPS TO ALUMINA CERAMIC ENVELOPES
Filed Oct. 31, 1966
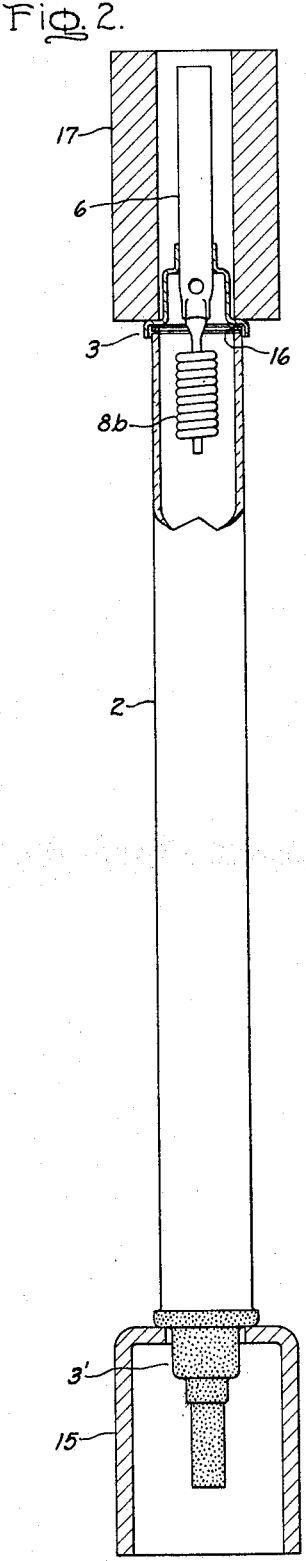
Inventor:
William C. Louden
by *Ernest W. Legros*
His Attorney

United States Patent Office 3,479,170
Patented Nov. 18, 1969

3,479,170
METHOD OF SEALING ZIRCONIUM HYDRIDE COATED NIOBIUM END CAPS TO ALUMINA CERAMIC ENVELOPES
William C. Louden, South Euclid, Ohio, assignor to General Electric Company, a corporation of New York
Filed Oct. 31, 1966, Ser. No. 590,569
Int. Cl. C04b *35/18, 35/48;* C03c *27/00*
U.S. Cl. 65—59                                   2 Claims

ABSTRACT OF THE DISCLOSURE

In sealing niobium end caps to alumina tubes with a sealing composition of alumina and calcia, a problem encountered in the increase in hardness which occurs in the niobium making it brittle and fragile. This is prevented by coating zirconium hydride on the outside of the niobium end cap prior to sealing to the alumina by vacuum firing.

---

This invention relates to sealing refractory metal parts to alumina ceramic, and more particularly to controlling the hardness of niobium end caps while sealing them to alumina ceramic tubes to make lamp envelopes.

Envelopes of high density transparent polycrystalline alumina are used for alkali metal vapor discharge lamps because they withstand the attack of the vapors even at high temperature. Patent 3,243,635—Ceramic Lamp Construction, issued Mar. 29, 1966, to myself and Richard S. Pinter, describes a ceramic lamp construction particularly suitable for high pressure sodium or cesium vapor lamps which utilizes a niobium end cap making a close fit on the end of an alumina ceramic tube and sealed to it by a thin layer of sealing material. The sealing material is a eutectic or near-eutectic mixture comprising mainly aluminum oxide and calcium oxide and optionally magnesium oxide, and it is resistant to alkali metal vapor attack. The sealing material is present as a thin layer having a thickness in the range of capillary attraction located between the mating surfaces of the ceramic envelope and the niobium end cap and bonded to both surfaces.

In sealing niobium end caps to alumina ceramic tubes, a problem encountered is an increase in the hardness of the niobium. As the niobium increases in hardness, it becomes brittle and relatively fragile and also it can no longer be cold welded. The object of this invention is to prevent or at least reduce the increase in hardness of niobium as a result of sealing to ceramic by means of a sealing mixture or glass consisting principally of calicia and alumina.

I have found that a coating of zirconium hydride on the outer surface of the niobium end cap can reduce the hardness of the niobium substantially to its original level. Desirably the zirconium hydride is coated on the outer surface of the end caps prior to the vacuum or under inert gas pressure firing by which the parts are sealed together. Excluding work hardening as a factor, the hardness of niobium is directly related to the oxygen content of the metal. It appears that during the sealing operation, the niobium acquires oxygen from the calcia-alumina sealing composition or other sources within the system and this causes its hardness to increase. The zirconium hydride coating serves to reduce the oxygen content of the niobium and thereby brings its hardness down and increases its ductility.

In the drawings, FIG. 1 shows a complete lamp embodying the invention and FIG. 2 shows the assembly of lamp parts preparatory to sealing.

Referring to the drawing and more particularly to FIG. 1, the illustrated lamp or arc tube comprises an envelope 2 of ceramic tubing consisting of sintered high density polycrystalline alumina. Such material and a method of preparing same is disclosed in U.S. Patent No. 3,026,210—Coble, Transparent Alumina and Method of Preparation. The ends of the tube are closed by thimble-like niobium closures or end caps 3, 3' hermetically sealed to the ceramic by means of a sealing composition or glass comprising primarily aluminum oxide and calcium oxide. At the upper end of the tube which is shown sectioned, the sealing glass, exaggerated in thickness in order to permit illustration, is indicated at 4 in the space between the expanded shoulder portion 5 of the end cap and the side and end of the ceramic tube. A niobium tube 6 penetrates into the thimble and is brazed or welded to the reduced diameter collar portion 7. A thermionic electrode 8 is mounted in each end of the arc tube and consists of a double layer tungsten wire coil with the interstices filled with activating material in the form of alkaline earth oxides. The tungsten coil is wound over a tungsten shank 9 which is brazed in the crimped inner end 11 of niobium tube 6. Tube 6 of upper end cap 2 is apertured at 12 into the interior of the arc tube and is used as an exhaust tube during subsequent manufacture to introduce the gas filling and the sodium mercury amalgam does into the arc tube.

In accordance with the invention, in order to reduce the hardness of the niobium which has been found to increase as a result of sealing, a coating of zirconium hydride is provided on the outer surface of the niobium end cap as indicate at 14. The zirconium hydride may be applied as a slurry in a suitable binder on the outside surface of the end cap, that is on the caps 5 and on exhaust tube 6 or dummy tube 6'.

A preferred method for applying the zirconium hydride in lamp manufacture consists in first preparing a slurry by ball-milling zirconium hydride in an acrylic binder (Acryloid A–10—Rohm & Hass Co.) thinned with Cellosolve acetate as necessary to form a slurry. After ball milling, the viscosity is adjusted by adding Cellosolve acetate as needed to form a "paint" which can be applied by means of an artist's brush as a thin coating on the exhaust tubes and cups. A ceramic tube 2 is assembled with a pair of zirconium hydride-coated end caps by vertical stacking in a suitable jig or fixture as indicated in FIG. 2. End cap 3' provided with a dummy exhaust tube is located lowermost and supported on a pedestal 15. A sealing composition washer is placed within the expanded shoulder of the cup and alumina tube 2 is seated on it. Another sealing washer 16 and an end cap 3 having an exhaust tube are sealed on the upper end of the alumina tube. A weight 17 is placed on the upper end cap 3 in order to press all the parts together. The assembly is then laced in a vacuum furnace which is pumped down to a high vacuum, suitably $5 \times 10^{-6}$ torr while the furnace temperature is raised to about 1500° C. At this temperature the sealing glass washers melt and spread out between the mating surfaces of the alumina tube 2 and the niobium end caps 3, 3' and fill the joints. Upon cooling, the parts are bonded together with only a small fillet of the sealing glass indicated at 4 showing at the joining or meeting edges. The zirconium hydride coating is effective in gettering oxygen during the sealing operation and removes dissolved oxygen from the niobium.

The use of zirconium hydride results in a decided improvement by lowering the hardness and increasing the ductility of the niobium end caps. Measurements have shown that niobium sheet as received from the manufacture may vary in hardness from 90 to 120 diamond pyramid hardness (DPH) units per the Vickers tabulation.

After drawing the sheet material into end caps of desired configuration, the hardness is increased to 180–190 DPH due to work hardening and some oxidation taking place. The hardness may again be reduced by annealing in a vacuum at 1300° C. for a period of a half hour and this will result in 130–150 DPH. Sealing with a composition consisting primarily of calcia and alumina again raises the hardness, into the range of 250–400 DPH, apparently due to oxygen dissolving into the niobium from the sealing composition. However coating zirconium hydride on the outer surface of the niobium end cap prior to sealing reduces the oxygen content of the niobium and restores the hardness down to the original 90–120 DHP level. No adverse side effects due to the presence of the zirconium have been observed.

What I claim as new and desire to secure by Letters Patent of the United States is:

1. In the method of reducing the increase in hardness of thin-walled niobium closures in the process of sealing them to ceramic envelopes by means of a sealing composition comprising primarily alumina and calcia, the improvement which comprises coating the outside surface of said closures with material consisting essentially of zirconium hydride and then firing in vacuum or under inert gas pressure at a temperature sufficient to melt said composition.

2. The method of claim 1 wherein the envelope consists of high density polycrystalline alumina, the sealing composition consists of a near-eutectic mixture of alumina, calcia, and magnesia, and firing is done at a temperature of at least 1500° C.

References Cited

UNITED STATES PATENTS

| | | | |
|---|---|---|---|
| 2,859,512 | 11/1958 | Dijksterhuis | 29—501 |
| 3,243,635 | 3/1966 | Louden | 65—59 |
| 3,281,309 | 10/1966 | Ross | 65—43 |

S. LEON BASHORE, Primary Examiner

E. R. FREEDMAN, Assistant Examiner

U.S. Cl. X.R.

29—473.1, 501; 65—32, 43, 60